United States Patent [19]

Tanaka et al.

[11] Patent Number: 5,562,339
[45] Date of Patent: Oct. 8, 1996

[54] VEHICULAR LIGHTING UNIT HAVING CONNECTOR PROTECTED FROM VIBRATION

[75] Inventors: Toshio Tanaka; Takaaki Nishizawa, both of Shizuoka, Japan

[73] Assignee: Koito Manufacturing Co., Ltd., Tokyo, Japan

[21] Appl. No.: 423,999

[22] Filed: Apr. 18, 1995

[30] Foreign Application Priority Data

Apr. 26, 1994 [JP] Japan ..................................... 6-109138

[51] Int. Cl.$^6$ ....................................................... B60Q 1/04
[52] U.S. Cl. .............................. 362/61; 362/265; 362/390
[58] Field of Search ................................ 362/61, 80, 226, 362/265, 263, 390, 457

[56] References Cited

U.S. PATENT DOCUMENTS

| | | | |
|---|---|---|---|
| 3,467,822 | 9/1969 | Plume | 362/390 |
| 4,890,202 | 12/1989 | Blanche | 362/457 |
| 5,188,444 | 2/1993 | Makita et al. | 362/265 |

FOREIGN PATENT DOCUMENTS

| | | |
|---|---|---|
| 2124944 | 11/1972 | Germany. |
| 3641852A1 | 6/1988 | Germany. |

Primary Examiner—Denise L. Gromada
Assistant Examiner—Y. Quach
Attorney, Agent, or Firm—Sughrue, Mion, Zinn, Macpeak & Seas

[57] ABSTRACT

An vehicular lighting unit in which a connector is prevented from being dislodged and disconnected from a light bulb due to vibration of the connector during operation of the vehicle, and the connector is prevented from short-circuiting and touching the lit bulb that has been heated to high temperatures. The lighting unit includes a lamp housing, a lens covering the front opening of the lamp housing, a reflector placed in the lamp space formed with the lamp housing and the lens, and a bulb detachably fitted to the reflector, wherein an opening for use in replacing the bulb is formed on the rear side of the lamp housing, a detachable cover member is provided for the opening, a power supply cord is passed through the cover member, and a connector for coupling the power supply cord and the connecting cord connected to the bulb is fitted into the recessed portion provided inside the cover member and fixedly supported thereby.

12 Claims, 7 Drawing Sheets

VEHICULAR LIGHTING UNIT HAVING CONNECTOR PROTECTED FROM VIBRATION

BACKGROUND OF THE INVENTION

The present invention relates to a vehicular lighting unit in which a connector used to supply current to a light bulb is prevented from being dislodged and disconnected due to vibration of the connector during operation of the vehicle, thus preventing the connector from short-circuiting and further preventing it from touching the light bulb when it has been heated to a high temperature.

FIG. 10 illustrates an example of a conventional vehicular lighting unit a.

As shown in FIG. 10, a lamp housing b is in the form of a container having an opening, the front opening of which is covered with a lens c. A reflector d is mounted within the lamp chamber e defined by the lamp housing b and the lens c. The reflector d is fitted with a detachable light source bulb f.

Further, there is provided an opening g through the rear surface of the lamp housing b which is used in replacing the bulb f. The opening g is covered with a detachable cover member h.

A power supply cord i is passed through the cover member h, and a connector j is connected to the internal end of the power supply cord i. The terminal l connected to the leading end of the connecting cord k extending from the bulb f is connected to the connector j, whereby the bulb f is connected to a power supply via the connecting cord k, the connector j and the power supply cord i.

In the case of the aforementioned conventional vehicular lighting unit a, however, the connector j can vibrate considerably in response to vibration of the vehicle during operation because the connector j is not supported by any external member. Thus, the terminal l of the connecting cord k sometimes can be dislodged and disconnected from the connecting cord k. In addition, rapid vibration may damage the connecting cord k and the power supply cord i, thus causing short-circuiting.

Especially if the connector j, which is made of synthetic resin, touches the light source bulb f when the latter is heated to high temperature, there also arises a problem in that the body of the connector j may be deformed.

SUMMARY OF THE INVENTION

In order solve the foregoing problems, a vehicular lighting unit according to the present invention is provided with a lamp housing, a lens covering the front opening of the lamp housing, a reflector disposed in the lamp chamber formed by the lamp housing and the lens, and a light source bulb detachably fitted to the reflector, wherein an opening for use in replacing the light source bulb is formed on the rear side of the lamp housing, a detachable cover member is provided for the opening, a power supply cord is passed through the cover member, and a connector for coupling the power supply cord and the connecting cord connected to the light source bulb is fixedly supported inside the cover member.

Since the connector is fixedly supported inside the cover member in the vehicular lighting unit constructed according to the present invention, the connector is prevented from vibrating during operation of the vehicle. Consequently, problems arising from vibration of the vehicle are overcome by the invention by preventing the terminal of the connecting cord from coming off, preventing the connecting and power supply cords from being damaged, and preventing the connector from touching the light source bulb when the bulb is lit.

DESCRIPTION OF THE PREFERRED EMBODIMENTS

Figure 1:
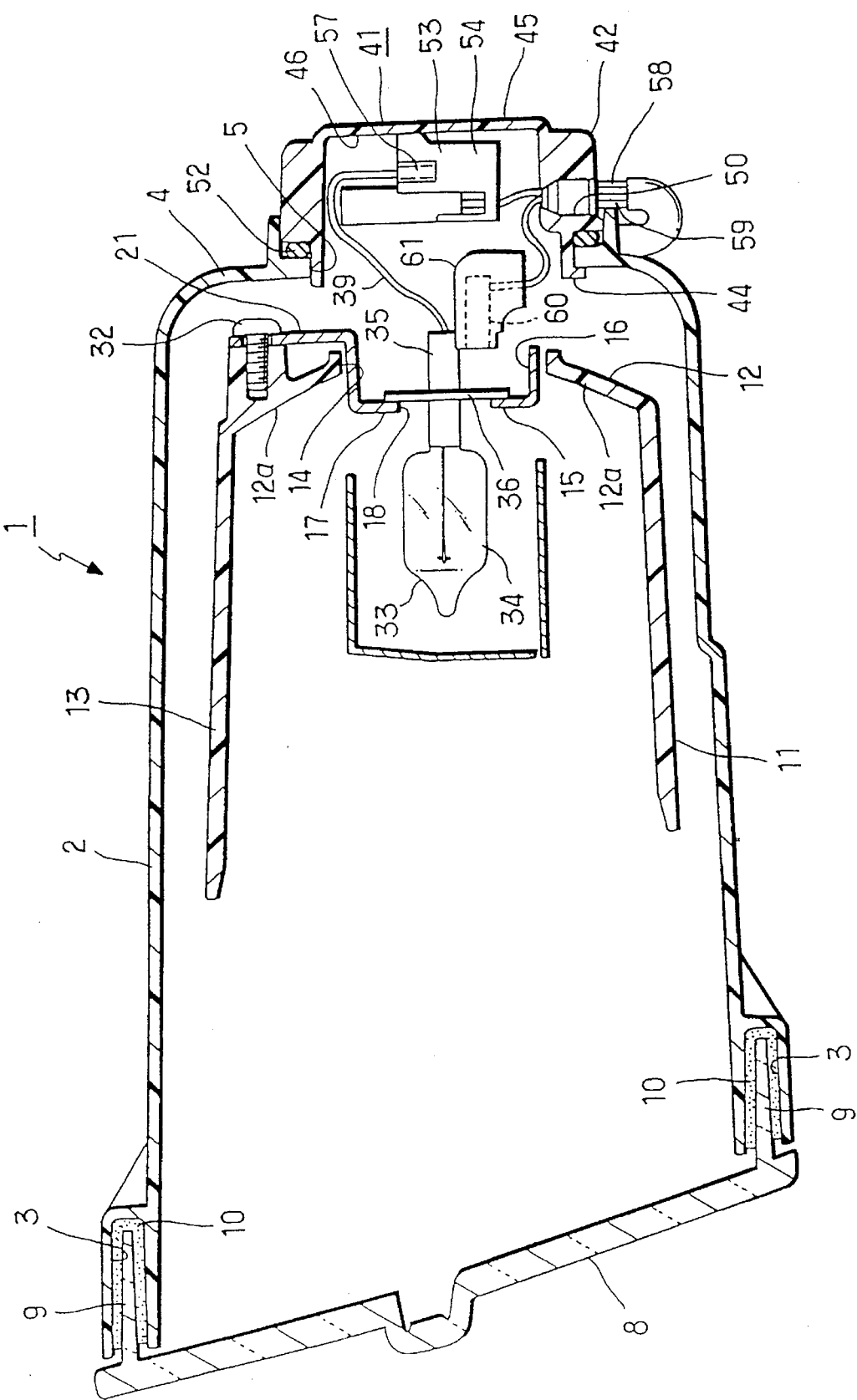
FIG. 1 shows a vertical sectional view of a vehicular lighting unit constructed according to the invention.
Figure 2:
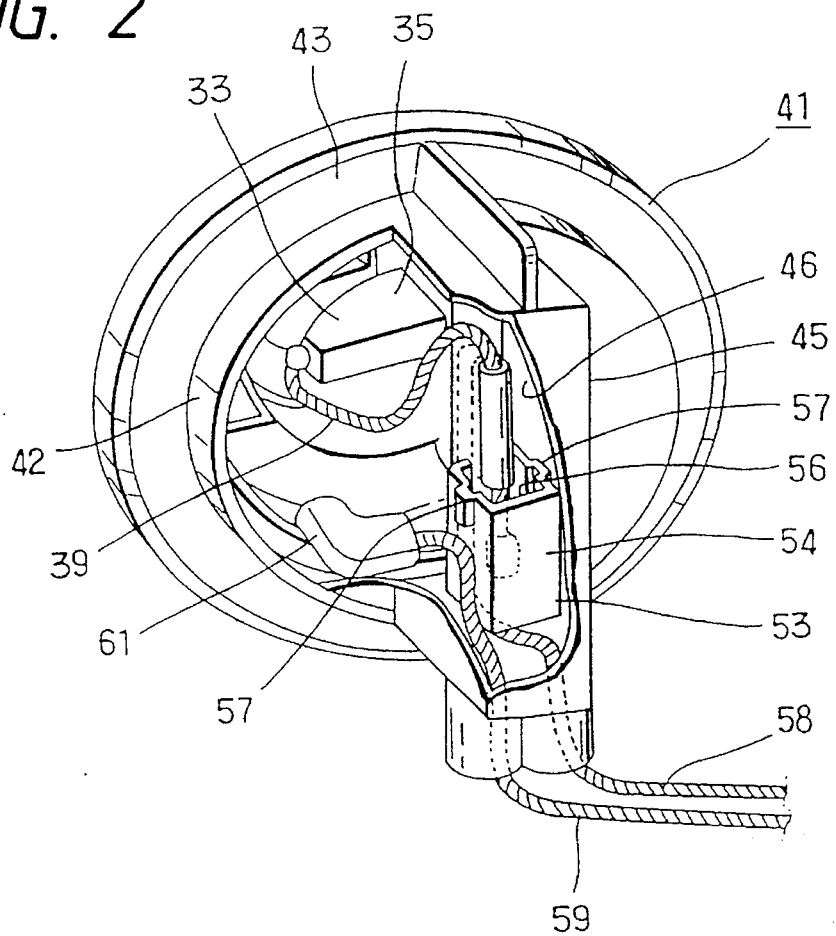
FIG. 2 is a partially exploded enlarged perspective view of a cover member.
Figure 4:
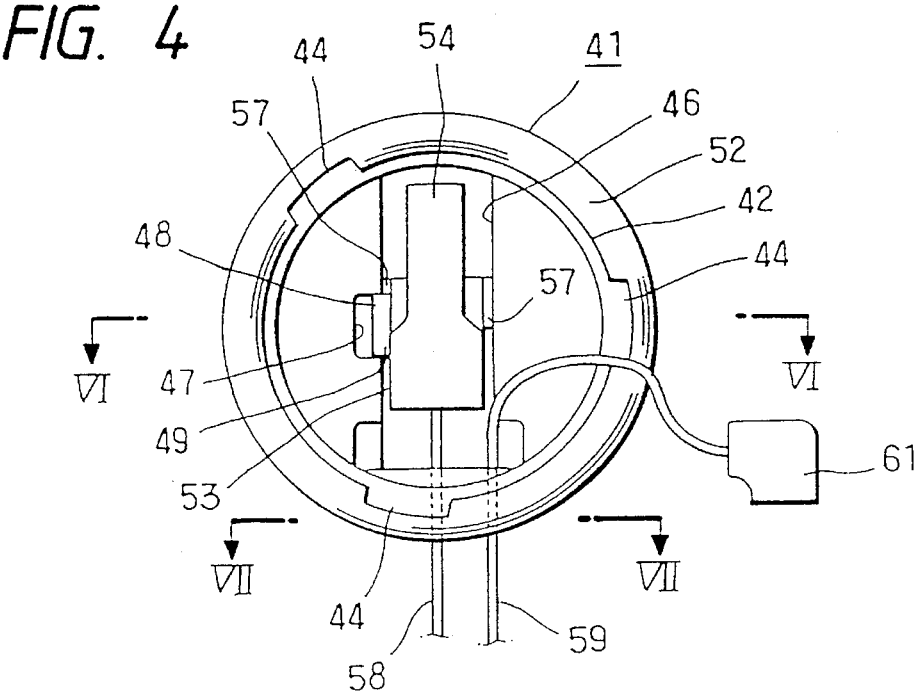
FIG. 4 is an elevational view of the lighting unit of FIG. 1.
Figure 3:
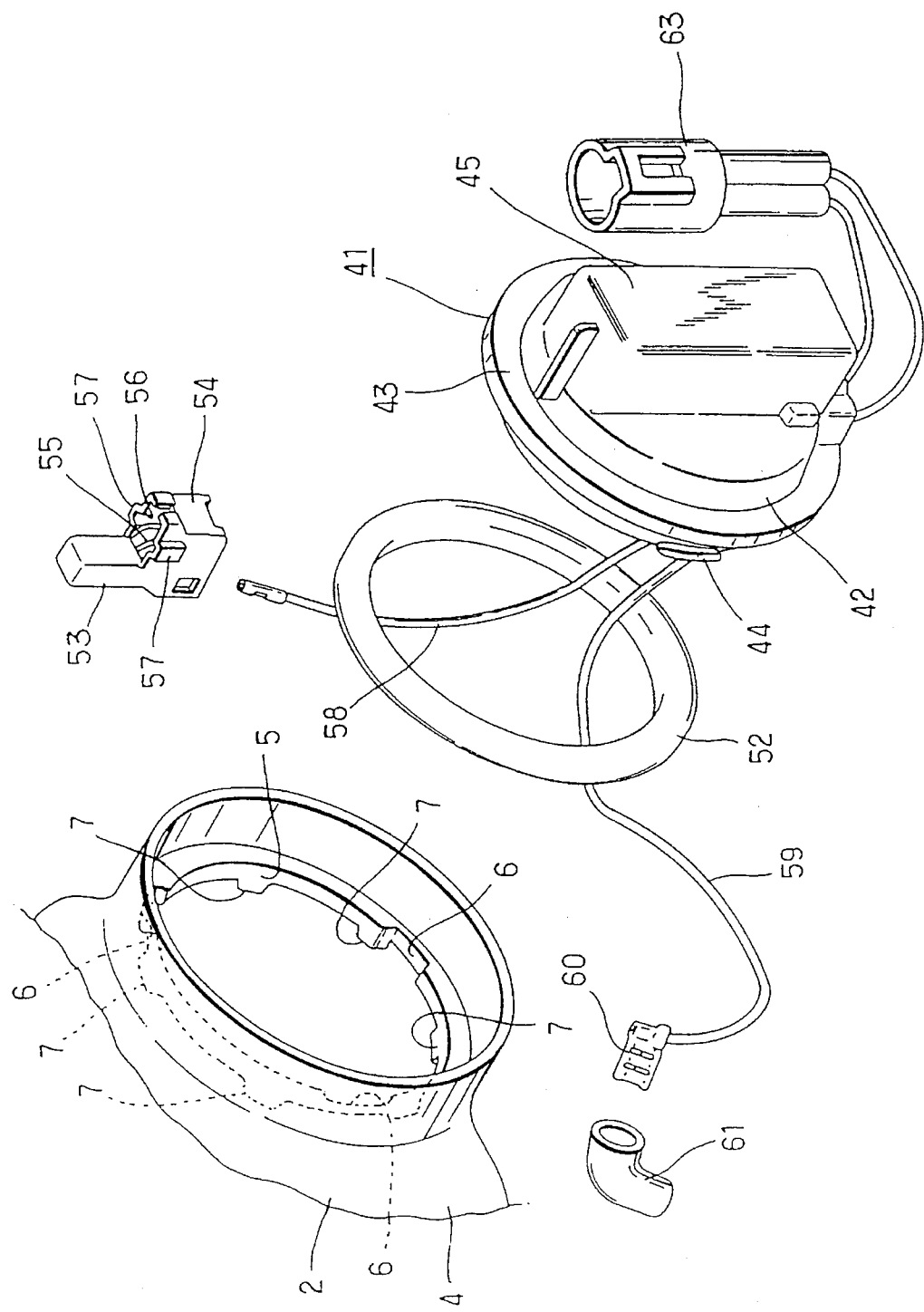
FIG. 3 is an enlarged exploded perspective view of the lighting unit of FIG. 1.
Figure 5:
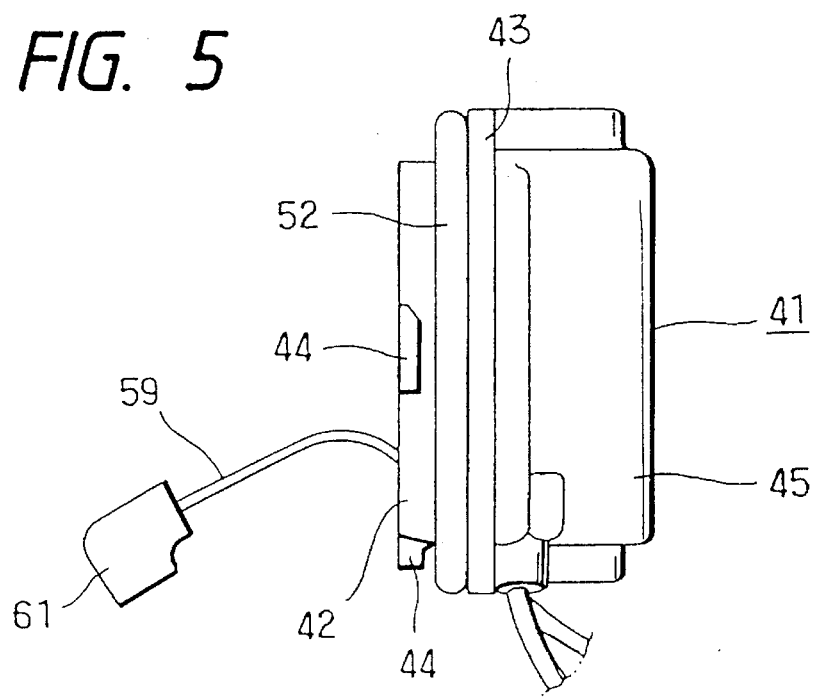
FIG. 5 is a side view of the lighting unit of FIG. 1.
Figure 6:
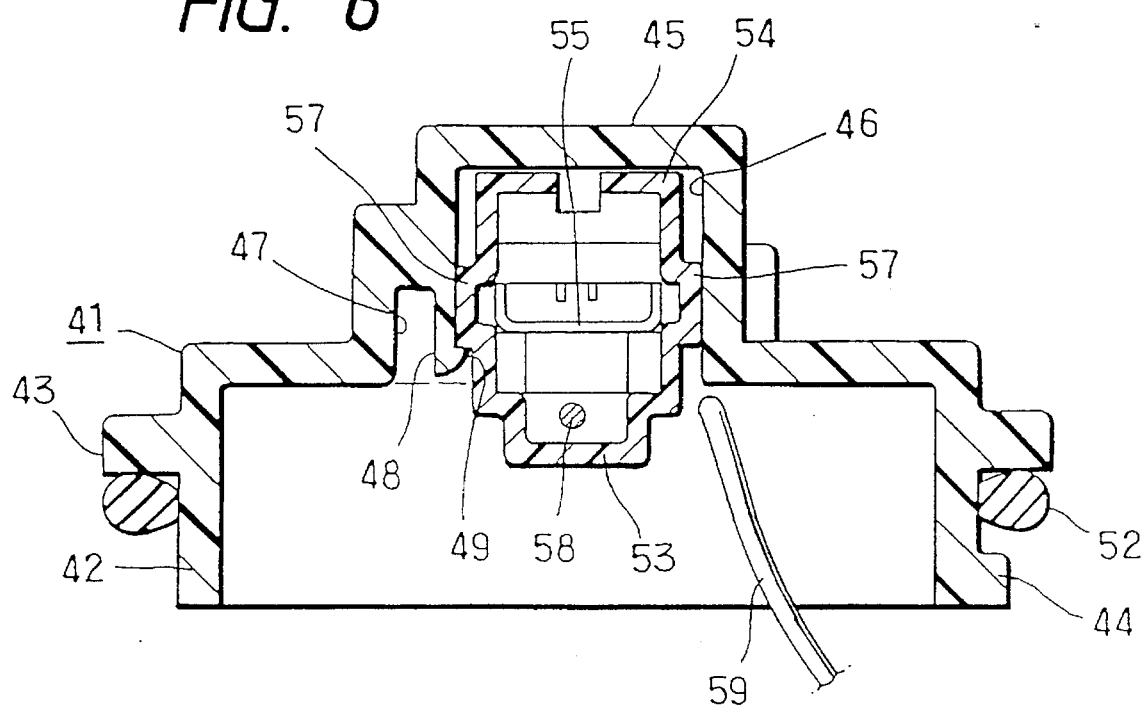
FIG. 6 is a sectional view taken on line VI—VI in FIG. 4.
Figure 7:
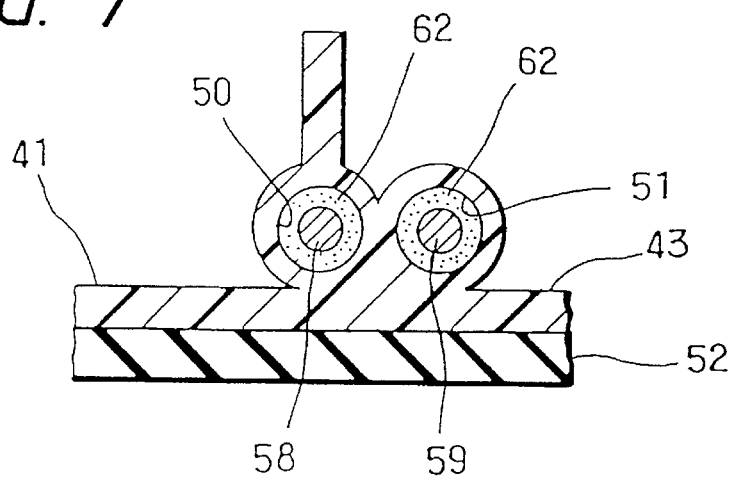
FIG. 7 is a sectional view taken on line VII—VII in FIG. 4.
Figure 8:
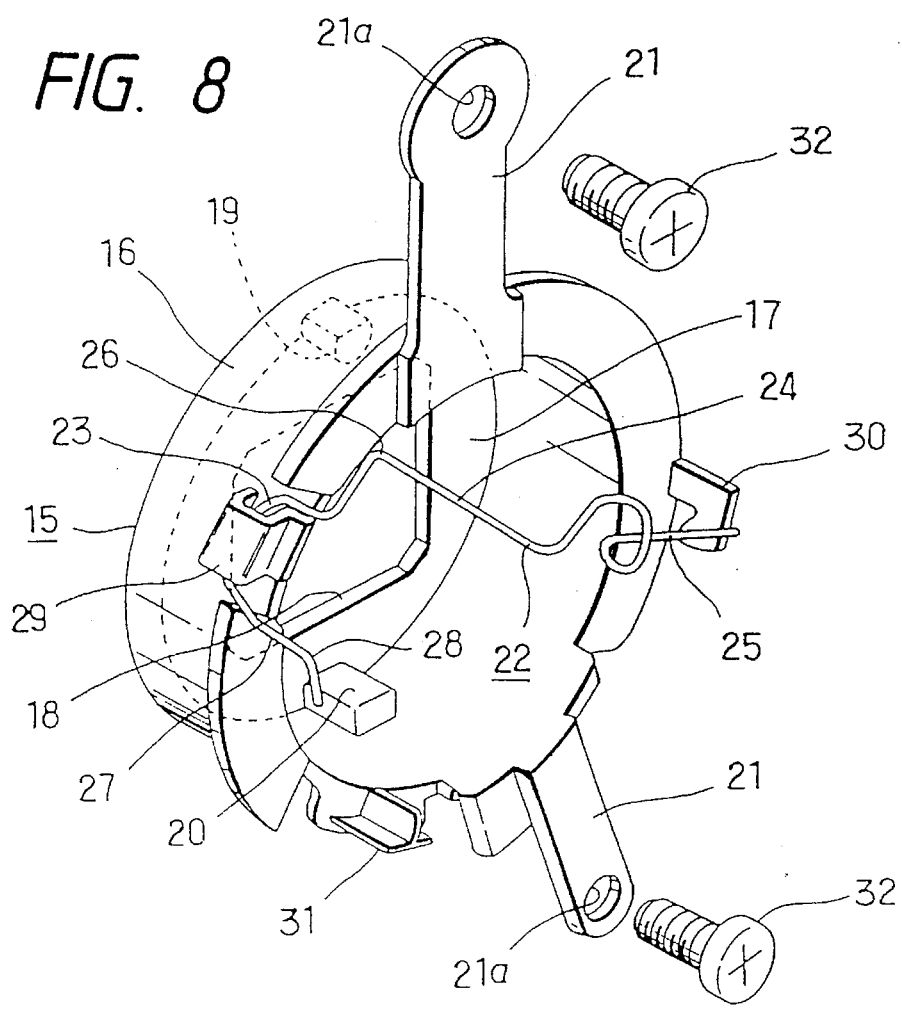
FIG. 8 is an enlarged perspective view of a socket base as shown in FIG. 9.
Figure 9:
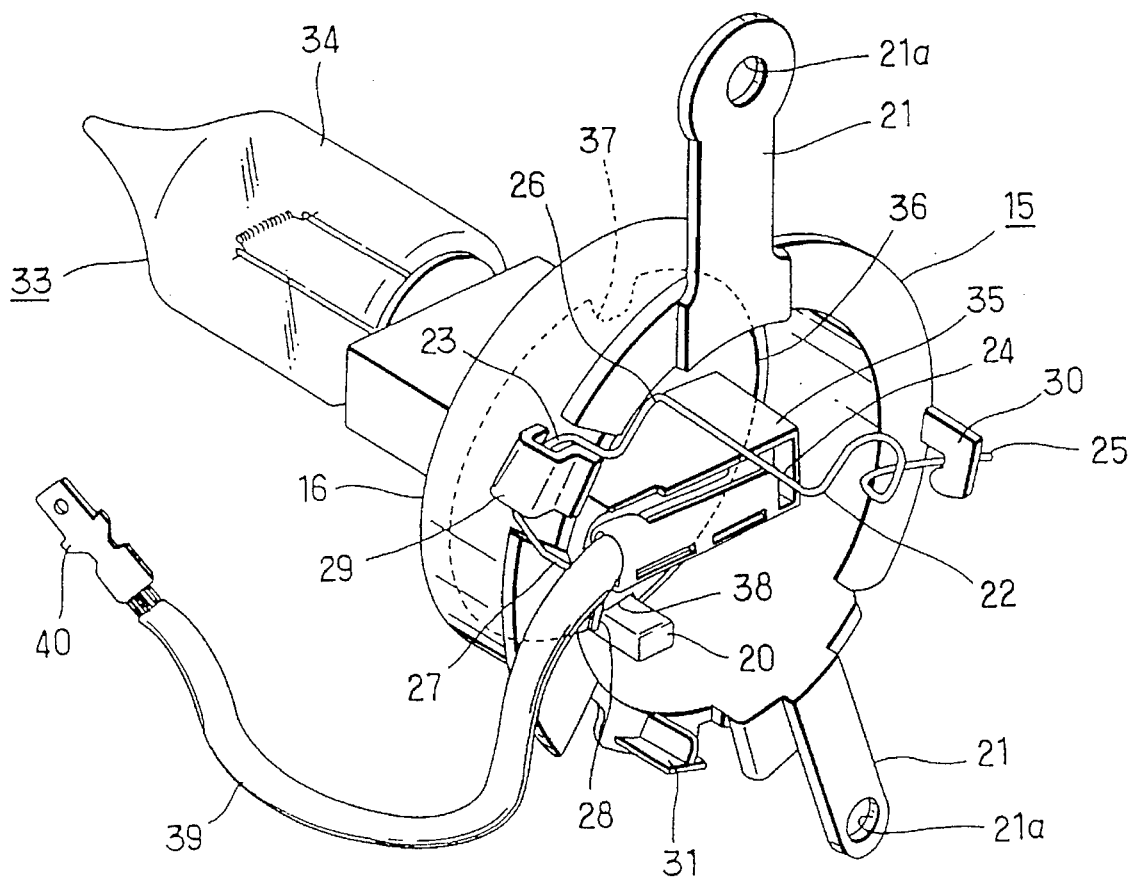
FIG. 9 is an enlarged perspective view of the lighting unit illustrating a condition wherein the bulb has been installed.
Figure 10:
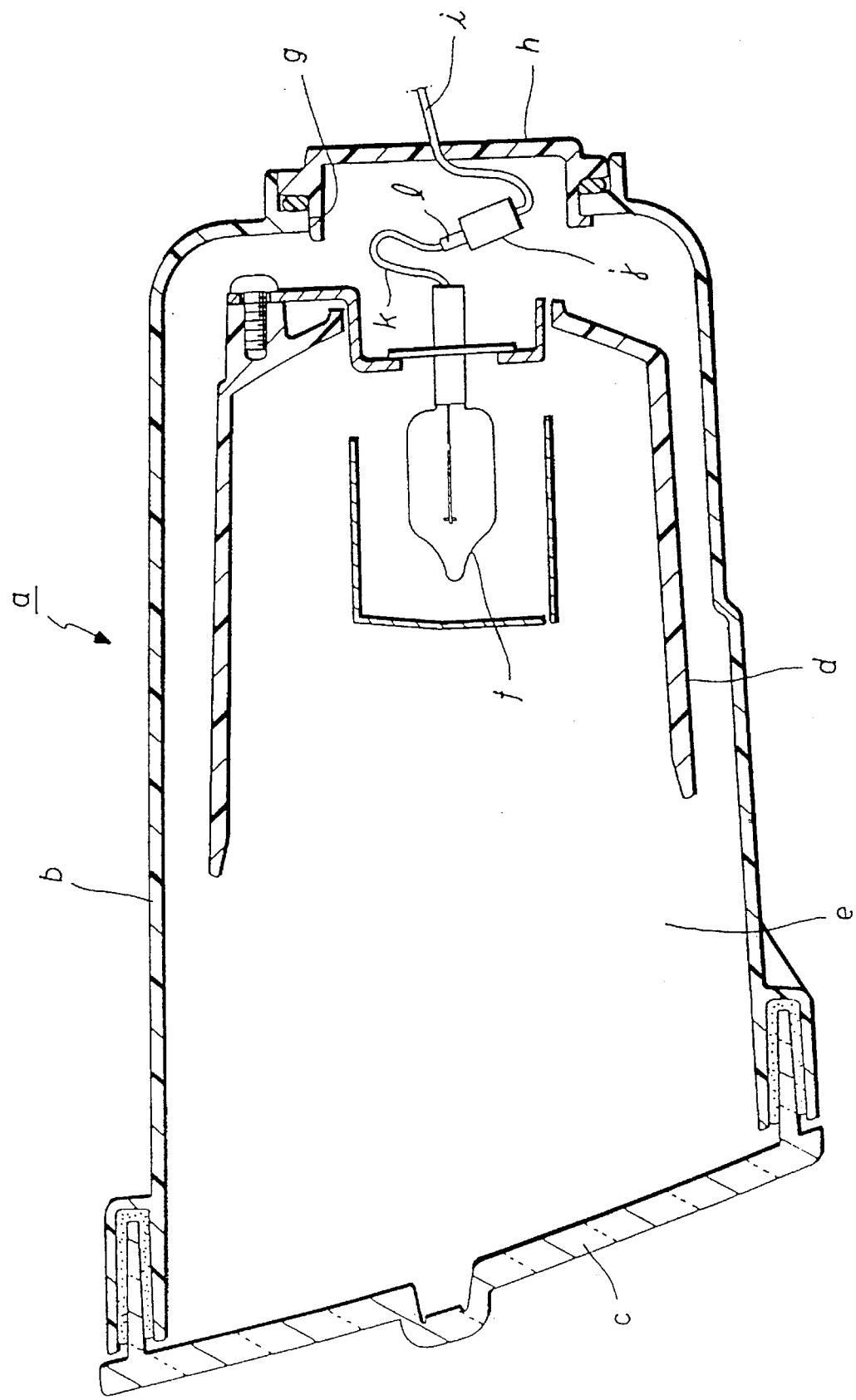
FIG. 10 is a vertical sectional view of a conventional lighting unit.

Referring to FIG. 1, a detailed description will subsequently be given of a vehicular lighting unit embodying the present invention. This embodiment relates to a case where the lighting unit is applied to an automotive fog lamp.

As shown in FIG. 1, a lamp housing 2 made of synthetic resin has generally the shape of a rectangular container having an opening in the front side thereof. A forwardly opening sealing groove 3 is formed along the edge of the front opening of the lamp housing 2.

Further, a circular opening 5 for use in replacing the bulb used as the light source of the lamp is formed in substantially the central portion of the rear side wall 4 of the lamp housing 2. The open edge of the opening 5 is provided with notches 6 formed at peripheral intervals. Moreover, protrusions 7, each positioned offset from a respective one of the notches 6, are provided along the open edge of the opening 5 inside the rear side wall 4 of the lamp housing 2.

A sealing leg 9 projects rearward from the peripheral edge of a lens 8. The sealing leg 9 is fitted into the sealing groove 3 of the lamp housing 2, and sealed and secured thereto with hot melt 10.

A reflector 11 is formed with a parabolic face 12 and a peripheral wall 13 projecting forward from the peripheral edge of the parabolic face 12, the parabolic face 12 and the peripheral wall 13 being integrally formed. The front 12a of the parabolic face 12 is coated with a reflective material so as to form a reflective parabolic surface. A bulb-fitting hole 14 is formed in the central portion of the parabolic face 12.

There is also provided a socket base 15 formed by aluminum die-casting. The main portion 16 of the socket base 15 is in the form of a short tube extending in the axial direction and which is integrally formed with a front plate 17 provided so as to cover the front of the main portion 16 above. A larger diameter through-hole 18 is formed in the front plate 17. On the inner peripheral face of the main portion 16 there is provided a sectionally semicircular and longitudinally extending rib 19 and a sectionally rectangular rib 20 positioned opposite one another.

Fitting pieces 21 project sideways from respective locations situated opposite one another at the rear end of the main portion 16. Further, through-holes 21a are formed at the leading ends of the fitting pieces 21.

A presser bar spring 22 is substantially a V-shaped wire spring as viewed from the rear side, with the V-shaped bent portion 23 forming its support. The long arm 24 is bent so that its mid-portion is V-shaped in side view, with the leading end of the arm 24 forming a retaining part 25. Further, the bent portion of the long arm 24 and the leading end of the short arm 27 are pressers 26, 28 for pressing down the flange of the light bulb, as will be described in more detail later.

A support protrusion 29 is formed at the rear end of the main portion 16. The support 23 of the presser bar spring is rotatably supported by the support protrusion 29, whereby the presser bar spring 22 is supported by the socket base 15 in such a manner that the presser bar spring 22 is longitudinally turned with the support 23 as a fulcrum.

A retaining projection 30 is formed at a position slightly offset from the position directly opposite the support protrusion 29 of the rear end of the main portion 16. The retaining part 25 of the presser bar spring 22 is detachably retained thereby.

A ground terminal 31 projects rearward from the rear end of the main portion 16.

While the main portion 16 of the socket base 15 remains in the bulb-fitting hole 14 of the reflector 11, mounting screws 32 that have been inserted into the through-holes 21a of the fitting pieces 21 from the rear are screwed into the back of the parabolic face 12 of the reflector 11 so that the socket base 15 is secured to the reflector 11.

A light source bulb 33 is composed of a glass bulb 34, a base 35, and a flange 36 projecting from the base 35. Further, the flange 36 is also provided with a semicircular notch 37 and a rectangular notch 38 in its peripheral edge, the notches 37, 38 being formed in positions opposite to each other.

A connecting cord 39 extends from the rear end of the bulb 33, and a tongue-like terminal 40 is connected to the leading end of the connecting cord 39.

The light bulb 33 may be, for example, an H3-type tungsten halogen lamp (European standard).

To insert the bulb into the socket base, the presser bar spring 22 is first urged rearward, and then a portion of the bulb 33 preceding the flange 36 is passed through the through-hole 18 of the socket base 15 so that the flange 36 abuts against the back of the front plate 17. At this time, the semicircular notch 37 formed in the flange 36 engages the semicircular rib 19 of the socket base 15 and the rectangular notches 38 of the flange 36 also engage the rectangular rib 20 of the socket base 15, whereby the fitting of the bulb 33 to the socket base 15 is completed.

The presser bar spring 22 is turned forward in that state to cause the pressers 26, 28 to abut the back of the flange 36 of the bulb 33 so as to mate the retaining part 25 with the retaining projection 30 of the socket base 15. The flange 36 of the bulb 33 is thus pressed by the presser bar spring 22 against the front plate 17 of the socket base 15 and fitted via the socket base 15 to the reflector 11. However, the bulb 33 can be removed in a simple manner by releasing the retaining part 25 of the presser bar spring 22 from the retaining projection 30 of the socket base 15, that is, by stoping the presser bar spring 22 from applying pressure to the front plate 17 by turning the presser bar spring 22 rearward.

A support (not shown) is provided to support the reflector 11 fitted with the bulb 33 slidably in the lamp housing 2.

In the case described, the bulb 33 can be fitted to and removed from the reflector 11 through the opening 5 provided in the rear side wall 4 of the lamp housing 2.

A cover member 41 is detachably fitted to the opening of the lamp housing 2, the cover member 41 being made of synthetic resin.

A main portion 42 of the structure shown in FIG. 1 is an axially short tube with the rear end closed, a flange 43 projecting to a small extent from the outer external peripheral face of the rear end of the main portion 42. Mating pieces 44 protrude outward from the front end of the main portion 42 at fixed peripheral intervals.

Further, a protrusion 45, which is rectangular as viewed from the rear side, is formed on the rear side of the main portion 42. The inside of the protrusion 45 is a recessed rectangular (as viewed from the front) portion 46. A notch 47 is also formed on one side of the leading end of the recessed portion 46, and a mating piece 48 protrudes forwardly from a position close to the one side in the rear of the notch 47. Further, a mating rib 49 protruding toward the recessed portion is formed at the front end of the mating piece 48.

Parallel through-holes 50, 51 open sideways in the rear of the main portion 42.

The cover member 41 is detachably fitted into the opening of the lamp housing 2. An O-ring 52 is externally fitted to the main portion 42 on the front side of the flange 43. In this state, the mating pieces 44 on the front side of the main portion 42 are fitted via the notches 6 into the front side of the opening 5 of the lamp housing 2. When the cover member 41 is then turned, the open edge of the opening 5 is held by the mating pieces 44 and the flange 43 via the O-ring 52, whereby the cover member 41 is fitted to the lamp housing 2 in such a state that it covers the opening 5. In this case, the cover member 41 is turned to the extent that its mating pieces 44 abut the protrusions 7 formed on the internal open edge of the opening 5.

A connector 53 is composed of a generally rectangular plastic body 54 and a contact set in the body 54. Raised portions 57, slightly protruding outward, are formed on both sides 56 of the body 54 close to the opening.

A power supply cord 58 is passed through the through-hole 50 of the cover member 41, and one end of the power supply cord 58 positioned within the cover member 41 is connected to the contact 55.

A ground cord 59 is passed through the hole 51 of the cover member 41, and a ground contact 60, situated within the cover member 41, is connected to the other end of the ground cord 59. An insulating cover 61 is added to the ground contact 60.

The through-holes 50, 51 with the cords 58, 59 passing therethrough are filled with a resin adhesive 62, such as that sold under the trade name Alon Alfar, to secure the cords 58, 59 into the corresponding through-holes 50, 51 and also to seal the spaces between the through-holes and the cords.

The power supply cord 58 and the ground cord 59 are connected to an external connector 63.

The connector 53 having the terminal 40 of the connecting cord 39 inserted into the cubic body 54 is fitted into the cover member 41 with the terminal 40 in contact with the contact 55. When the connector 53 is fitted into the recessed portion 46, one end of the mating piece 48 first bends outward, and when the connector 53 is positioned inside the recessed portion 46, the mating piece 48 returns to its original portion. The mating rib 49 is then mated with the front side of the raised portion 57 of the connector 53 to prevent the connector 53 from being released from the recessed portion 46 of the connector 53. In this manner, the connector 53 is fixedly supported by the cover member 41.

Subsequently, the ground contact 60 is connected to the ground terminal 31 formed on the socket base 15. In this state, the cover member 41 is fitted to the opening 5 of the lamp housing 2.

When the cover member 41 is removed from the lamp housing 2, the cover member 41 is turned reversely, and upon matching the mating pieces 44 with the notches 6 of the opening 5, the cover member 41 is pulled backward.

A protrusion 45 formed for the recessed portion 46 may be used as a knob for turning the cover member 41.

In the case of the aforementioned fog lamp, vibration of the connector 53 is constrained, even when induced by vibration of the vehicle during operation, since the connector 53 is fitted into and supported by the recessed portion 46 of the cover member 41. Therefore, the terminal 40 of the connecting cord 39 is prevented from being dislodged and disconnected, and thus damage to the connecting cord 39 and the power supply cord 58 is averted, and the lit bulb 33 is prevented from touching the connector 53.

As described above, the vehicular lighting unit according to the present invention includes the lamp housing, the lens covering the front opening of the lamp housing, the reflector disposed within the lamp chamber defined by the lamp housing and the lens, and the light source bulb detachably fitted to the reflector, wherein the opening for use in replacing the bulb is formed on the rear side of the lamp housing, the detachable cover member is provided for the opening, the power supply cord is passed through the cover member, and the connector for coupling the power supply cord and the connecting cord connected to the bulb is fixedly supported inside the cover member.

Since the connector is fixedly supported inside the cover member in the vehicular lighting unit according to the present invention, the connector is prevented from vibrating in response to vibration of the vehicle when in operation, thereby attaining the above-mentioned advantages.

The configuration and structure of each part in the aforementioned embodiment of the present invention have only been referred to by way of example, and the invention is needless to say not restricted to the above-described embodiment thereof.

What is claimed is:

1. A vehicular lighting unit comprising:

a lamp housing;

a lens covering a front opening of said lamp housing;

a reflector disposed in a lamp chamber defined by said lamp housing and said lens;

a light source bulb;

a socket base detachably fitting said bulb to said reflector, an opening configured for replacing said bulb and being formed on a rear side of said lamp housing;

a detachable cover member covering said opening;

a power supply cord passing through said cover member; and a connector coupling said power supply cord and a connecting cord connected to said bulb, said connector being fixedly supported inside said cover member, wherein said cover member includes a main portion (42) comprising a protruding portion extending in an axial direction of said bulb and having a closed rear end, and a protrusion (45) which protrudes from said rear end, said protrusion defining a recess (46) in said cover member, said connector lying entirely within a region defined by said recess and said axially protruding portion, said connector being supported on an inner wall of said cover member within said recess.

2. The vehicular lighting unit of claim 1, wherein said socket base comprises a main portion in the form of a tubular portion extending in an axial direction of said bulb, and a front plate integrally formed with said tubular portion, a through-hole being formed in said front plate for receiving said bulb.

3. The vehicular lighting device of claim 2, wherein a sectionally semicircular and longitudinally extending rib and a sectionally rectangular rib positioned opposite one another are formed on an inner peripheral face of said main portion, said ribs being received in respective notches formed in a flange of said bulb.

4. The vehicular lighting device of claim 3, further comprising a presser bar spring comprising a wire spring having a bent portion pressing against the flange of said bulb, and a pair of support protrusions formed on said main portion of said socket base retaining respective end portions of said pressure bar spring.

5. The vehicular lighting device of claim 3, further comprising fitting pieces extending radially from said main portion of said socket base, through-holes being formed in end portions of said fitting pieces, and a pair of screws extending through respective ones of said through-holes for fixing said socket base to said reflector.

6. The vehicular lighting device of claim 1, wherein said axially protruding portion is tubular, said protrusion is rectangular when viewed from the rear end of said main portion, and said recess is rectangular when viewed from a front of said cover member.

7. The vehicular lighting device of claim 6, wherein through-holes are formed in said cover member, said power supply cord passing through one of said through holes, and further comprising a ground cord passing through another one of said through holes, said ground cord being connected to a ground terminal of said bulb.

8. The vehicular lighting device of claim 7, wherein said connector comprises a plastic body and a contact in said body, one end of said power supply cord being connected to said contact.

9. The vehicular lighting device of claim 8, further comprising an insulating cover covering an end of said ground cord.

10. The vehicular lighting device of claim 9, further comprising a resin adhesive filling said through-holes in said cover member to secure said cords into the corresponding ones of said through-holes and to seal spaces between said through-holes and said cords.

11. The vehicular lighting device of claim 8, wherein said connector comprises a raised portion and said protrusion comprises a mating rib to hold said connector within said recess.

12. The vehicular lighting device of claim 1, wherein said protrusion comprises a knob for turning said cover member.

* * * * *